Jan. 18, 1938.  M. STEWART  2,105,867
BRAKE
Filed May 25, 1936   2 Sheets-Sheet 1
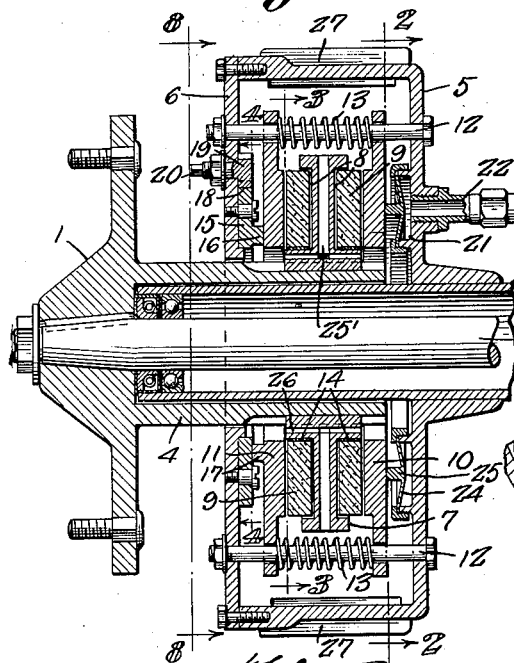
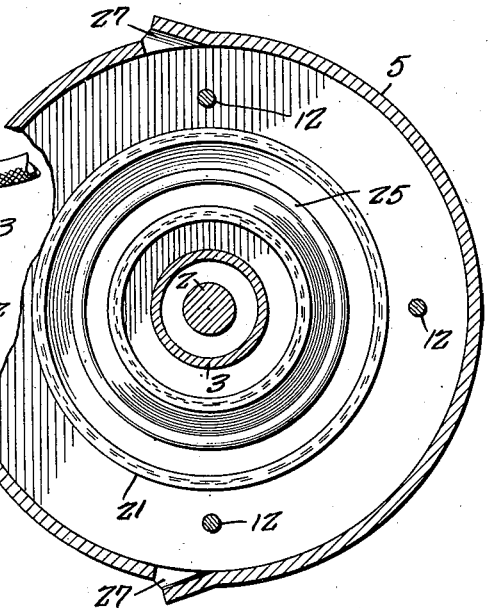
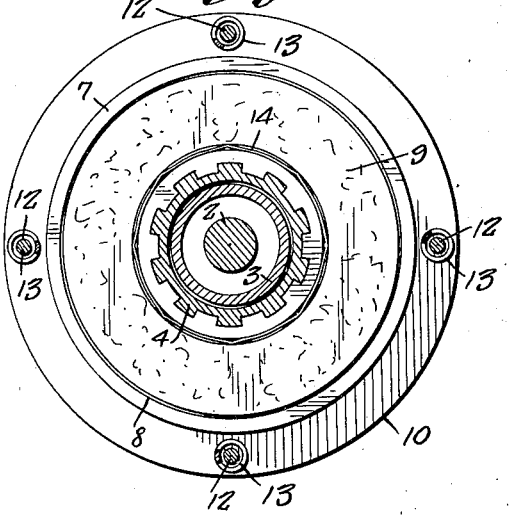
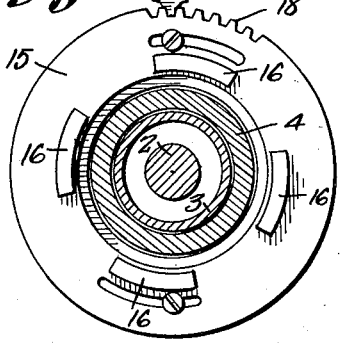
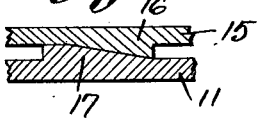
Marvin Stewart,
INVENTOR Jan. 18, 1938.                M. STEWART                    2,105,867
                                BRAKE
                          Filed May 25, 1936          2 Sheets-Sheet 2
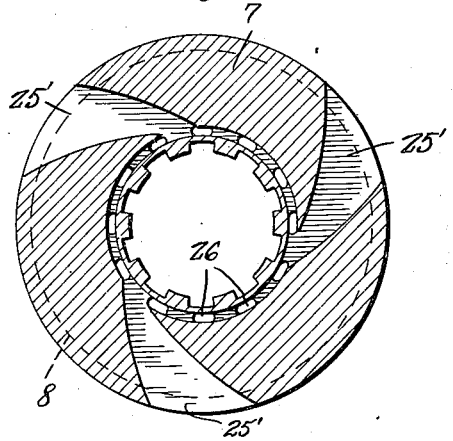
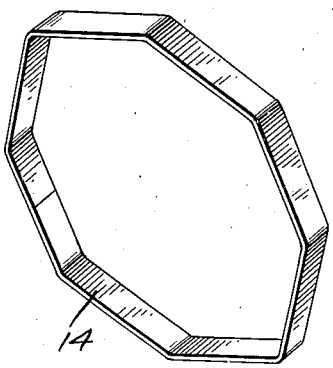
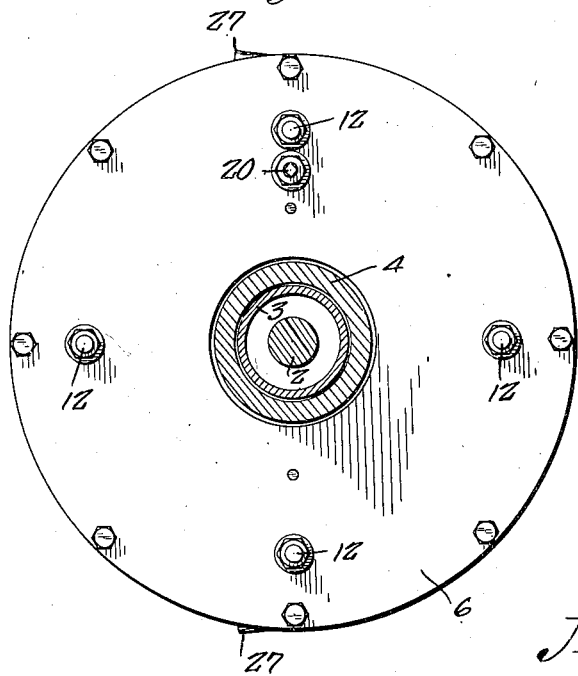
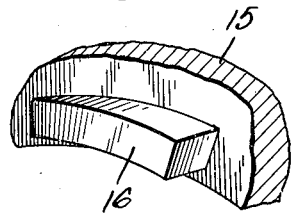
Marvin Stewart,
INVENTOR Patented Jan. 18, 1938

2,105,867

UNITED STATES PATENT OFFICE 2,105,867

BRAKE

Marvin Stewart, Ashland, Ky.

Application May 25, 1936, Serial No. 81,767

3 Claims. (Cl. 188—72)

This invention relates to brakes for motor vehicles either of the pneumatic or hydraulic type and has for the primary object the provision of a device of this character which will have maximum braking capacity with a minimum number of parts easily adjusted and repaired and will permit the successful use of floating brake linings free of wear when the brake is in non-applied position, and also the construction of the device is such as to eliminate noise and prevent overheating during application of the brake.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary vertical sectional view illustrating a brake constructed in accordance with my invention.

Figure 2 is a sectional view taken on the line 2—2 of Figure 1.

Figure 3 is a sectional view taken on the line 3—3 of Figure 1.

Figure 4 is a sectional view taken on the line 4—4 of Figure 1.

Figure 5 is a fragmentary sectional view showing the coacting cams for the adjustment of the brake.

Figure 6 is a sectional view illustrating a braking plate of the brake.

Figure 7 is a perspective view illustrating a retaining spring for the brake lining.

Figure 8 is a sectional view taken on the line 8—8 of Figure 1.

Figure 9 is a fragmentary perspective view illustrating one of the brake adjusting cams.

Referring in detail to the drawings, the numeral 1 indicates a wheel hub mounted to an axle 2 and the latter being mounted in an axle housing 3. A tubular extension 4 is integral with the hub 1 and receives therein the axle housing 3 and is free to rotate relative to said axle housing. The foregoing description describes a well known construction other than the tubular extension which forms part of the present invention.

Fixed to the axle housing 3 is a brake housing 5 having a removable wall 6 apertured to permit the tubular extension 4 to extend therein. A braking plate 7 is splined to the tubular extension for a limited endwise movement of the latter and is confined in the brake housing 5 and its opposite faces have formed therein annular grooves 8 to receive annular floating brake linings 9. Arranged opposite the brake linings are pressure plates 10 and 11 loosely mounted on supporting rods 12 carried by the brake housing 5. Mounted on the supporting rods and interposed between the pressure plates are coil springs 13 acting to move the pressure plates away from said brake linings. The hub portion of the braking plate 7 underlies both of the brake linings and interposed between said brake linings and the hub portion of the braking plate are springs 14, each of the construction as shown in Figure 7. The purpose of the springs is to retard movement of the brake linings with respect to the braking plate and the springs 13 act to position the pressure plates away from said brake linings so that there will not be a drag on the brake linings during the non-application of the brakes, consequently reducing the wear to a minimum. Also the springs referred to prevent noise.

An adjusting plate 15 is mounted to the brake housing 5 for a limited rotation and has formed on one face thereof spaced cams 16 adapted to coact with cams 17 formed on the pressure plate 11. In order to impart rotation to the adjusting plate 15 in opposite directions, the adjusting plate is provided with teeth 18 which mesh with a pinion 19 secured to an adjusting shaft 20 journaled in the removable wall 6 of the housing 5. By turning the adjusting shaft the adjusting plate may be advanced towards and from the pressure plate 11 so as to vary the size of the spaces between the brake linings and the pressure plate. A chamber 21 is formed integrally with the housing 5 and is in communication with a nipple 22 connected to the fluid operating brake mechanism (not shown). The chamber 21 has removably supported therein a diaphragm 24 on which is formed an annular rib 25 to contact the pressure plate 10 during the application of the brake by the fluid pressure acting on the diaphragm so as to force the pressure plates, braking plate and brake linings endwise of the tubular extension 4 and thereby bring about binding together of these parts due to the pressure plate 11 being held against endwise movement by the cams and adjusting plate 15. Thus from the foregoing it will be seen how the braking action is brought about and as soon as the fluid pressure in the chamber is relieved the diaphragm returns to its initial position and the springs 13 restore the pressure plates to initial position, freeing the brake linings of any wear and thereby bring about non-application of the brake.

The hub portion of the braking plate 7 has formed therein a series of air inlet ports 26 communicating with air exhaust passages 25' opening outwardly through the periphery of the braking plate. The passages 25' extend tangentially to the axis of rotation of the braking plate and also in an opposite direction to the direction of rotation of said braking plate so that the air will be caused to circulate through the braking plate to reduce the temperature of the latter during the application of the brake.

To provide air circulation through the housing 5, the periphery is provided with a series of slots 27 which open outwardly in a direction opposite to the general direction of movement of the vehicle to which the brake is adapted so that the movement of the vehicle will draw air out of the housing.

A brake of the character described may be successfully operated either by air or liquid.

Having described the invention, I claim:

1. A brake comprising a fixed brake housing, a tubular member extending out of said housing and fixed to a wheel hub, a braking plate splined to said tubular member, floating brake linings arranged at opposite sides of the braking plate, pressure plates arranged opposite the brake linings and slidably supported in the brake housing, means acting to urge the pressure plates away from the brake linings, a chamber formed in the housing and adapted to receive fluid pressure of a brake operating mechanism, a diaphragm carried by said chamber and acted upon by the fluid pressure, a rib formed on the diaphragm to contact one of the pressure plates, cams formed on the other pressure plate, an adjusting plate mounted to the housing for a limited rotation, cams formed on the adjusting plate to coact with the first-named cam in adjusting the last-named pressure plate, and providing a stop therefor, and means for adjusting said adjusting plate.

2. A brake comprising a fixed brake housing, a tubular member extending out of said housing and fixed to a wheel hub, a braking plate splined to said tubular member, floating brake linings arranged at opposite sides of the braking plate, pressure plates arranged opposite the brake linings and slidably supported in the brake housing, means acting to urge the pressure plates away from the brake linings, a chamber formed in the housing and adapted to receive fluid pressure of a brake operating mechanism, a diaphragm carried by said chamber and acted upon by the fluid pressure, a rib formed on the diaphragm to contact one of the pressure plates, cams formed on the other pressure plate, an adjusting plate mounted to the housing for a limited rotation, cams formed on the adjusting plate to coact with the first-named cams in adjusting the last-named pressure plate and providing a stop therefor, teeth formed on the adjusting plate, a pinion meshing with said teeth, an adjusting shaft journaled to the housing and secured to the pinion.

3. A brake comprising a fixed brake housing, a tubular member extending out of said housing and fixed to a wheel hub, a braking plate splined to said tubular member, floating brake linings arranged at opposite sides of the braking plate, pressure plates arranged opposite the brake linings and slidably supported in the brake housing, means acting to urge the pressure plates away from the brake linings, a chamber formed in the housing and adapted to receive fluid pressure of a brake operating mechanism, a diaphragm carried by said chamber and acted upon by the fluid pressure, a rib formed on the diaphragm to contact one of the pressure plates, cams formed on the other pressure plate, an adjusting plate mounted to the housing for a limited rotation, cams formed on the adjusting plate to coact with the first-named cam in adjusting the last-named pressure plate and providing a stop therefor, teeth formed on the adjusting plate, a pinion meshing with said teeth, an adjusting shaft journaled to the housing and secured to the pinion, and spring members engaging the brake linings and the braking plate.

MARVIN STEWART.